United States Patent
Takinosawa

(10) Patent No.: US 6,609,179 B1
(45) Date of Patent: Aug. 19, 2003

(54) METHOD AND APPARATUS FOR CONTROLLING MEMORY ACCESS

(75) Inventor: Jun Takinosawa, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 8 days.

(21) Appl. No.: 09/767,709

(22) Filed: Jan. 24, 2001

(51) Int. Cl.⁷ ............................ G06F 12/14; G06F 13/00
(52) U.S. Cl. ..................... 711/152; 711/149; 711/147; 710/313; 710/240
(58) Field of Search ................................. 711/147, 148, 711/149, 150, 151, 152, 153; 710/200, 241, 305, 306, 308, 309, 313, 314

(56) References Cited

U.S. PATENT DOCUMENTS

| | | | | |
|---|---|---|---|---|
| 4,766,530 A | * | 8/1988 | Roslund | 340/825.5 |
| 5,603,051 A | * | 2/1997 | Ezzet | 711/147 |
| 5,805,905 A | * | 9/1998 | Biswas et al. | 710/241 |
| 5,996,051 A | * | 11/1999 | Mergard | 711/147 |
| 6,018,612 A | * | 1/2000 | Thomason et al. | 386/125 |
| 6,185,704 B1 | * | 2/2001 | Pawate et al. | 714/719 |
| 6,205,522 B1 | * | 3/2001 | Hudson et al. | 711/147 |

FOREIGN PATENT DOCUMENTS

EP 1102171 A2 * 11/2000 ......... G06F/13/38

* cited by examiner

Primary Examiner—Donald Sparks
Assistant Examiner—Paul Baker
(74) Attorney, Agent, or Firm—McDermott, Will & Emery

(57) ABSTRACT

A device for controlling memory access in a USB interface. The device includes an interface unit for receiving data from an external source, and a memory control unit coupled to the interface unit. The memory control unit includes a microprocessor unit, a main memory unit and a shared memory unit. The microprocessor unit is capable of storing and retrieving data from the main memory unit. Both the microprocessor unit and the interface unit are capable of storing and retrieving data from the shared memory unit. The device further includes a first bus for coupling the interface unit to the microprocessor; a second bus for coupling the interface unit to the shared memory unit; and bus arbitration logic coupled to both the first bus and the second bus. The bus arbitration logic is operative for allowing the microprocessor to access the main memory unit of the memory control during the time period the interface unit is storing data in, or retrieving data from, the shared memory unit.

17 Claims, 4 Drawing Sheets

METHOD AND APPARATUS FOR CONTROLLING MEMORY ACCESS

FIELD OF THE INVENTION

The present invention relates to a method and device for controlling memory access, and more particularly to a device for controlling memory access for use in a Universal Serial Bus (USB) system.

BACKGROUND OF THE INVENTION

As is known, the USB is an industry standard cable bus which functions to support data exchange between a host computer (e.g., PC) and various peripheral devices. The USB interface to the host computer is referred to as the host controller.

FIG. 1 illustrates a typical prior art system for transferring data between a host PC and a peripheral device utilizing a USB. As shown, the system comprises a host PC 2, which is coupled to the USB core 10 (i.e., the host controller) via a standard USB bus interface 4. The USB core 10 is also coupled to a memory control unit (MCU) 20 via bus interface 6. As illustrated, the bus interface 6 comprises IRQ request line 21, read/write request line 22, an address bus 23 and a data bus 24. It is noted that typically, the USB core 10 and the MCU 20 are contained in the peripheral device coupled to the host PC 2.

The USB core 10 comprises serial interface engine (SIE) 11, a general function interface (GFI) 12, which is coupled to the SIE 11, and a first-in, first-out memory (FIFO) 13, which is coupled to both the SIE 11 and the GFI 12. The memory controller, hereafter referred to as the MCU 20, comprises a microprocessor unit (MPU) 21, a direct memory access unit (DMA) 22, and a memory unit 25. As shown, the IRQ request line 21, the r/w request line 22, the address bus 23 and the data bus 24 are all coupled between the GFI 12 and the MPU 21. In addition, r/w request line 22, the address bus 23 and the data bus 24 are also coupled to the memory unit 25. Finally, the DMA unit 22 is coupled to both the address bus 23 and the MPU 21.

In operation, the USB core 10 functions in-part to control the transfer of data between the host PC 2 and the MCU 20. Specifically, data transferred from the host PC 2 to the USB core 10 is received by the SIE 11 and stored in the FIFO memory 13. Once the data is received and placed in the FIFO memory 13, the SIE 11 generates a control signal which is coupled to the GFI 12 via control line 17 and which instructs the GFI 12 to generate an IRQ request signal. The IRQ request signal is transferred to the MPU 21 of the MCU 20. The IRQ request functions to inform the MCU 20 that data to be transferred to the MCU 20 is in the FIFO memory 13.

Upon receipt of the IRQ request signal, the MCU 20 releases the address bus 23 and the data bus 24 to the DMA unit 22. The DMA unit 22 then functions to transfer the data from the FIFO memory 13 to memory unit 25 via data bus 24. Upon completion of the transfer of data to the memory unit 25, the DMA unit 22 informs the MPU 21 that data transfer is complete, and then the MPU 21 reads the data stored in the memory unit 25, and performs the command (s)/instruction(s) contained in the data.

Upon completion of performing the command, the MPU 21 writes the results associated with the given command back to the memory unit 25. Once the data is stored in memory unit 25, the MPU 21 informs the USB core 10 that it is ready to transfer data back to thehost PC 2 by forwarding a signal to the GFI 12 via the R/W request line 22. The MPU 21 also releases the address bus 23 and the data bus 24 to the DMA unit 22, so that the DMA unit can effect transfer to the data stored in memory unit 25 to the FIFO memory 13 via the GFI 12. Upon receipt of a signal from the GFI 12 indicating that data transfer is complete, the SIE 11 transfers data to the host PC 2.

FIG. 2 illustrates the sequence of the data transfer process described above regarding the transfer of data from the USB core 10 to the MCU 20, and vica versa. In the first step, data is transferred from the host PC 2 to the SIE 11, and the SIE 11 stores the data in the FIFO memory 13. Next, in step (*1), upon receipt of the IRQ signal generated by the GFI 12, the MPU 21 releases the address bus 23 and the data bus 24, thereby making the DMA unit 22 active. Next, in steps (*2, *3), both the DMA unit 22 and the memory unit 25 are active, as the DMA unit 22 functions to transfer data contained in the FIFO memory 13 and store the data in the memory unit 25. Next, in step (*4), the MPU 21 reads the data from the memory unit 25 and performs the command set forth in the data. Next, in steps (*5, *6), the MPU 21 writes the data that will be transferred to the host PC 2 into the memory unit 25. Next, in step (*7), the MPU 21 once again releases the address bus 23 and the data bus 24 so as to make the DMA unit 22 active. Then, in steps (*8, *9), the DMA unit 22 functions to transfer the data in the memory unit 25 to the FIFO memory 13. It is noted that the MPU 21 generates a signal which is coupled to the GFI 12 indicating that data is ready to be sent to the USB core 10. Finally, in step (*10), the data stored in the FIFO memory 13 is transferred to the host PC 2 by the SIE 11.

Notwithstanding the ability of the USB core 10 and the MCU 20 to transfer data to and from the host PC 2, the foregoing prior art design suffers from the following problems. Most significantly, as explained above, the MCU 21 utilizes a DMA unit 22 to effect transfer of data to and from the USB core 10. As such, because the MPU 21, the DMA unit 22 and the memory unit 25 all utilize the same bus structure, during data transfer the MPU 21 must release the buses to the DMA unit 22. As a result, during the data transfer period, the MPU 21 is effectively prevented from performing any functions. Thus, the overall operational efficiency of the system is degraded. In addition, as the DMS unit 22 is utilized in all data transfers, the time required to complete such transfers is undesirable increased.

Furthermore, as memory unit 23 and FIFO memory 13 represent predefined memory components having a fixed size, it is always necessary to allocate a fixed amount of memory for both the FIFO memory 13 and a memory unit 23, which is sufficient to handling the data transfer loads anticipated in a given application. Such an implementation can disadvantageously result in the under utilization of the available memory.

Accordingly, there is exists a need for a device capable of effecting the transfer of data between a host PC and memory, which allows for a decrease in the time required to complete the data transfer and which allows a microprocessor unit contained in the device to perform tasks during the memory transfer process. In addition, there is also a need for a device for controlling memory access which minimizes the memory requirements of the system utilizing a USB interface.

SUMMARY OF THE INVENTION

In an effort to solve the aforementioned needs, it is an object of the present invention to provide a device for controlling memory access capable of effecting the transfer of data between a host PC and memory, which allows for a decrease in the time required to complete the data transfer and which allows a microprocessor unit contained in the device to perform tasks during the memory transfer process. It is also an object of the present invention to minimize the memory requirements of the system utilizing an USB interface.

In accordance with a first exemplary embodiment, the present invention relates to a device for controlling memory access which includes an interface unit for receiving data from an external source, and a memory control unit coupled to the interface unit. The memory control unit includes a microprocessor unit, a main memory unit and a shared memory unit. The microprocessor unit is capable of storing and retrieving data from the main memory unit. Both the microprocessor unit and the interface unit are capable of storing and retrieving data from the shared memory unit. The device further includes a first bus for coupling the interface unit to the microprocessor; a second bus for coupling the interface unit to the shared memory unit; and bus arbitration logic coupled to both the first bus and the second bus. The bus arbitration logic is operative for allowing the microprocessor to access the main memory unit of the memory control during the time period the interface unit is storing data in, or retrieving data from, the shared memory unit.

The present invention also relates to a method of controlling data transfer between an interface unit and a memory controller. The method comprises the steps of inputting external data to be transferred to the memory control unit into the interface unit; transferring the external data input into the interface unit directly into a shared memory unit, which forms part of the memory controller; generating a first control signal after the external data has been stored in the shared memory unit by the interface unit, where the control signal is operative for controlling bus arbitration logic functioning to allow a microprocessor unit forming part of the memory controller to access the shared memory unit; processing the data stored in the shared memory unit and storing any resultant data in the shared memory unit, generating a second control signal after the resultant data has been stored in the shared memory unit by the microprocessor, where the second control signal is operative for controlling the bus arbitration logic so as to prevent the microprocessor unit from accessing the shared memory unit; and retrieving the resultant data stored in the shared memory unit, where the resultant data is retrieved directly by the interface unit.

As described in further detail below, the present invention provides significant advantages over the prior art. Most importantly, as the design of the present invention eliminates the requirement of the DMA unit and allows the USP core to directly store data into the shared memory contained in the MCU, the present invention significantly reduces the time required to transfer data between the USB core and the MCU. In fact, it is estimated that the present invention reduces the transfer time by ½ in comparison to the device illustrated in FIG. 1.

In addition, as the present design eliminates the need for the DMA unit contained in the MCU and the FIFO memory in the USB core, the design of the present invention represents a cost savings in comparison with prior art designs.

Another advantage associated with the present invention is that it provides the programmer extreme flexibility with regard to amount of the memory to allocate to the shared memory. More specifically, the programmer may readily vary the size of the shared memory in accordance with the given application to be executed. Moreover, any memory space not allocated to the shared memory can be allocated to the main memory unit of the MPU.

Yet another advantage is that even though the shared memory is typically accessible by the USB core, the design of the present invention allows the MPU to access memory and execute commands simultaneously with the storage of data in the shared memory by the USB core. Accordingly, in contrast to the device illustrated in FIG. 1, the present design functions to increase the overall operational speed of the device.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

DETAILED DESCRIPTION OF THE INVENTION

Figure 3:
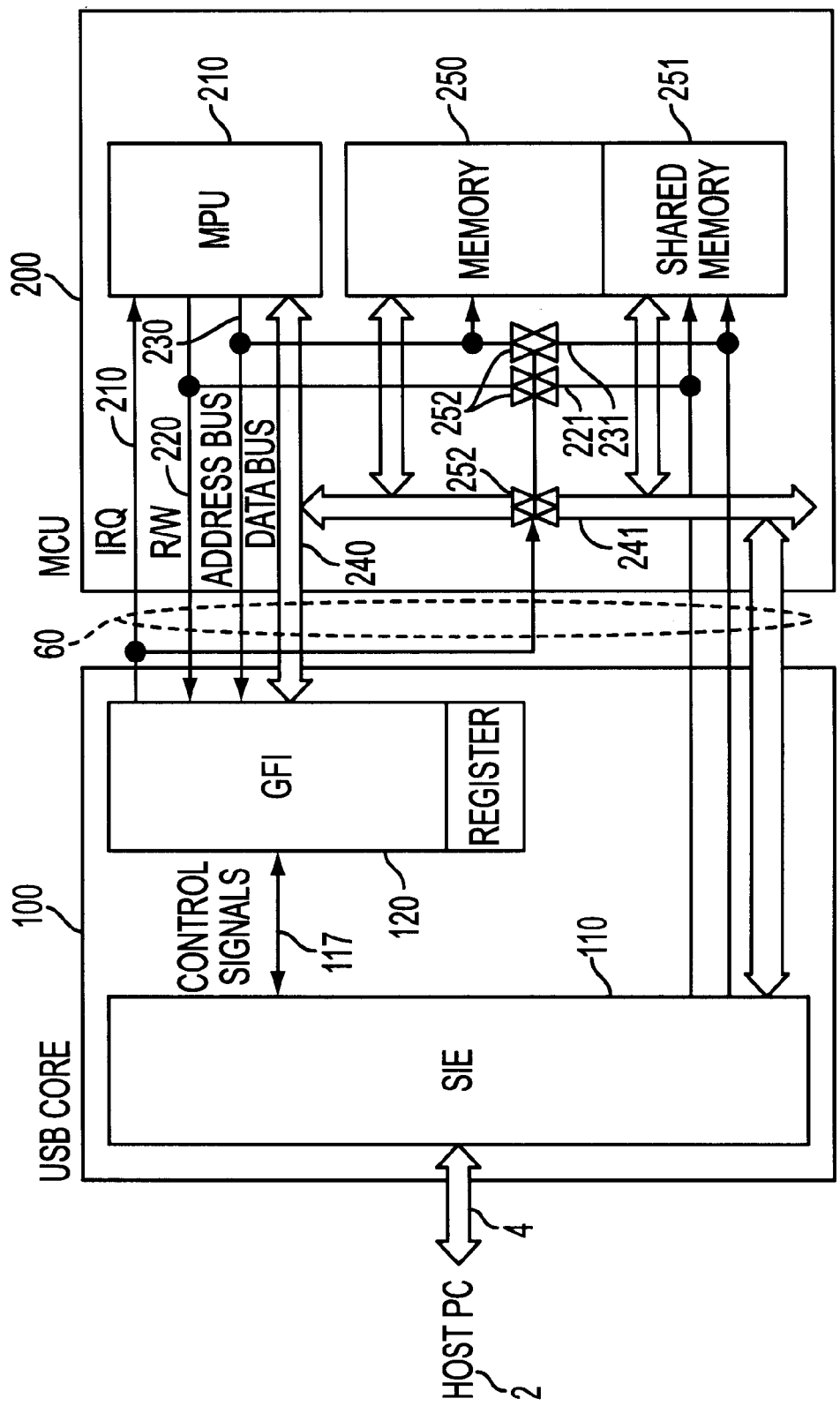
FIG. 3 illustrates an exemplary embodiment of the device for controlling memory access in accordance with the present invention.

FIG. 3 illustrates an exemplary embodiment of the device of the present invention operative for controlling the transfer of data between a host PC and a peripheral device utilizing a USB interface. As shown in FIG. 3, the device comprises a USB core 100, which is coupled to a host PC 2 via a standard USB bus interface 4. As explained in more detail below, the USB core 100 is also coupled to the MCU 200 via interface 60. It is again noted that typically, the USB core 100 and the MCU 200 are contained in the peripheral device coupled to the host PC 2.

The USB core 100 comprises serial interface engine (SIE) 110, and a general function interface (GFI) 120 which is coupled to the SIE 110 so as allow the transfer of control signals between the SIE 110 and the GFI 120 via control line 117. As illustrated, the interface 60 comprises IRQ request line 210, Read/Write request line 220, an address bus 230 and a data bus 240, which are coupled between the GFI 120 and the MCU 200. The interface 60 further comprises Read/Write request line 221, an address bus 231 and a data bus 241 which are coupled between the SIE 110 and the MCU 200. The specific interconnections of interface 60 with the MCU are set forth below in detail.

Referring again to FIG. 3, the MCU 200 comprises a microprocessor unit (MPU) 210, a memory unit 250 and shared memory 251. The MCU 200 further comprises bus arbitration logic 252. As shown, the IRQ request line 210 is coupled between the GFI 120 and the MPU 210. In addition, the IRQ request line 210 is also coupled to the bus arbitration logic 252, and as explained below, functions to control the state of the bus arbitration logic 252. Continuing, the address bus 230 and the data bus 240 are coupled between the GFI 120 and both the MPU 210 and the memory unit 250. In addition, both the address bus 230 and the data bus 240 are coupled to the bus arbitration logic 252. Finally, address bus 231 and data bus 241 are coupled between the SIE 110 and the shared memory 251, and to the bus arbitration logic 252.

It is noted that the bus arbitration logic 252 functions to either couple the read/write request line 220, the address bus 230 and the data bus 240 to the read/write request line 221, the address bus 231 and the data bus 241, respectively, or isolate these lines from one another. As stated, in the normal state, during which time the shared memory 251 is open to the SIE 110, the foregoing bus lines are isolated from one another. Thus, the bus arbitration logic 252, which in the current embodiment are standard bus switches, are open. As also stated, the bus arbitration logic 252 is turned on (i.e., switched closed) and off (i.e., switch open) by the IRQ signal. In the current embodiment, a logic low signal turns the bus arbitration logic off. It is noted that any suitable switch operative for coupling and decoupling the buses can be utilized.

The operation of the exemplary device illustrated in FIG. 3 is now described. Upon receipt of data from the host PC 2 by the SIE 110, the SIE 110 directly stores the data in the shared memory 251. It is noted that the bus arbitration logic 252 is set such that the shared memory 251 is typically available to the SIE 110. In other words, the IRQ request signal is low and the bus arbitration switches 252 are open. Upon completion of the transfer of data to the shared memory 251, the SIE 110 informs the GFI 120 that data transfer is complete via a control signal output by the SIE 110 and coupled to the GFI 120 via control line 117. It is noted that in accordance with the present invention, during the period of time when the bus arbitration logic 252 is off, the MPU 210 can still access memory unit 250 via address bus 230 and data bus 240.

Upon receipt of the control signal, the GFI 120 functions to turn the IRQ request line 210 high (i.e., logic "1"). By turning the IRQ request line 210 high, the switches contained in the bus arbitration logic 252 are closed, thereby connecting the read/write request line 220, the address bus 230 and the data bus 240 to the read/write request line 221, the address bus 231 and the data bus 241, respectively. The high IRQ request line 210, which is also coupled to the MPU 210, functions to inform the MPU 210 that there is now data to be read in the shared memory 251.

In the exemplary embodiment, the shared memory 251 is implemented utilizing a standard FIFO memory. As such, when either the SIE 110 or MPU 210 writes data into the shared memory, the associated write pointer moves, and when either the SIE 110 or the MPU 210 reads data from the shared memory 251, the associated read pointer moves. The result is that the MPU 251 functions to read data input by the SIE 110, and the SIE functions to read data input by the MPU 251.

Upon receiving the IRQ request signal, the MPU 210 retrieves the data from the shared memory 251, recognizes the command(s) contained therein, and performs any necessary function associated with the command(s). Once the MPU 210 has completed any necessary function(s), the data to be returned to the host PC 2 (i.e., the result of the executed command performed by the MPU 210) is stored in the shared memory 251 by the MPU 210. It is noted that the MPU 210 can also access memory unit 250 during the period the MPU 210 is allowed access to the shared memory unit 251.

When the MPU 210 has completed storing the data to be transferred to the host PC 2 in the shared memory 251, the MPU generates a control signal (e.g., set_inpacket_ready signal) which is forwarded to the GFI 120 via the read/write control line 220. Upon receiving the control signal from the MPU 210 indicating that data is ready to be transferred to the host PC 2, the GFI 120 functions to turn the IRQ request line 210 low, thereby turning off the switches contained in the bus arbitration logic 252. This results in the read/write request line 220, the address bus 230 and the data bus 240; and the read/write request line 221, the address bus 231 and the data bus 241, respectively, being disconnected from one another.

Next, the GFI 120 informs the SIE 110 that data is ready to be retrieved from the shared memory 251, via control line 117. The SIE 110, which now has access to the shared memory 251 via address bus 231 and data bus 241, retrieves the data from the shared memory 251, and transfers the data to the host PC 2.

Figure 4:
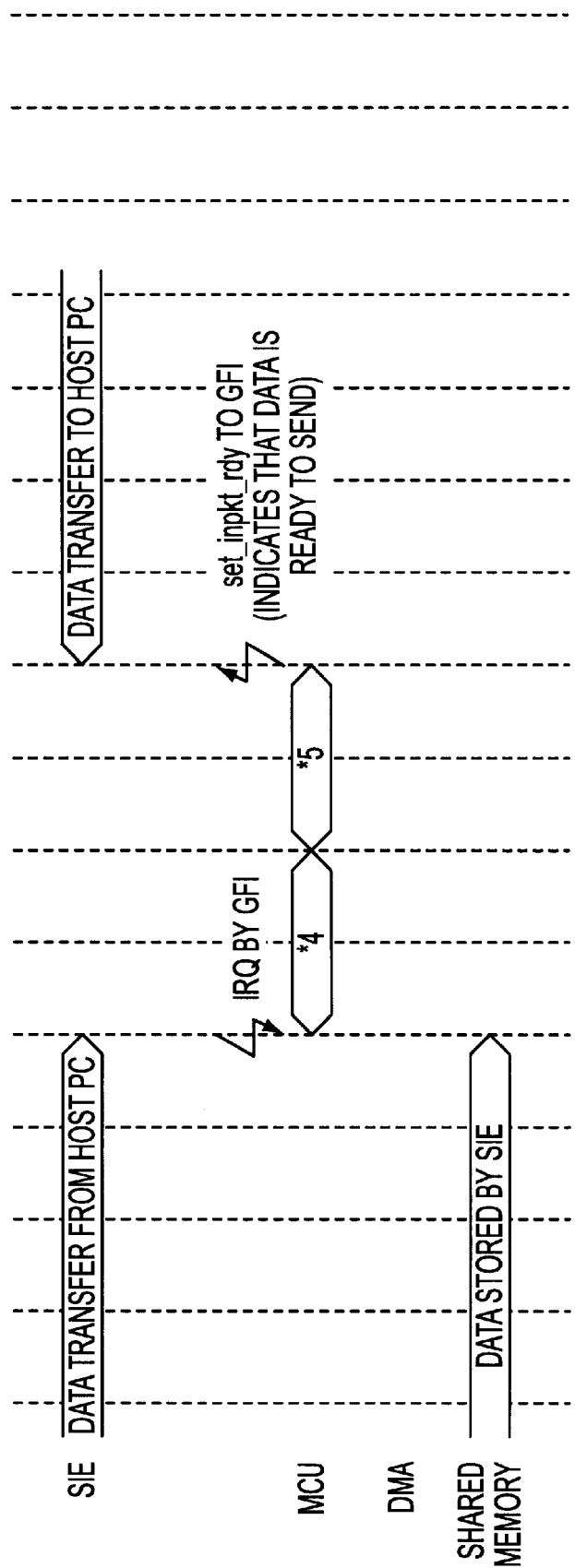
FIG. 4 illustrates the sequence of the data transfer process utilizing the exemplary embodiment of the present invention illustrated in FIG. 3.

FIG. 4 summarizes the sequence of the data transfer process described above regarding the transfer of data from the USB core 100 to the MCU 200, as well as the transfer of data from the MCU 200 to the USB core 100. In summary, upon receiving data from the host PC 2, the SIE 110 directly stores the data into the shared memory 251 and informs the GFI 120 that data is ready to be read by the MCU 200. The GFI 120 then generates the IRQ request signal, which functions to instruct the MCU 200 to read the data from the shared memory 251 (step *4). Upon completing the necessary functions associated with the data read from the shared memory 251, the MCU 200 stores the resultant data back into the shared memory 251 and generates a set_inpacket_ ready signal (step *5). The set_inpacket_ready signal functions to inform the USB core 100 that data is ready to be retrieved from the shared memory 251. The data is then retrieved by the SIE 110 and transferred to the host PC 2.

Figure 1:
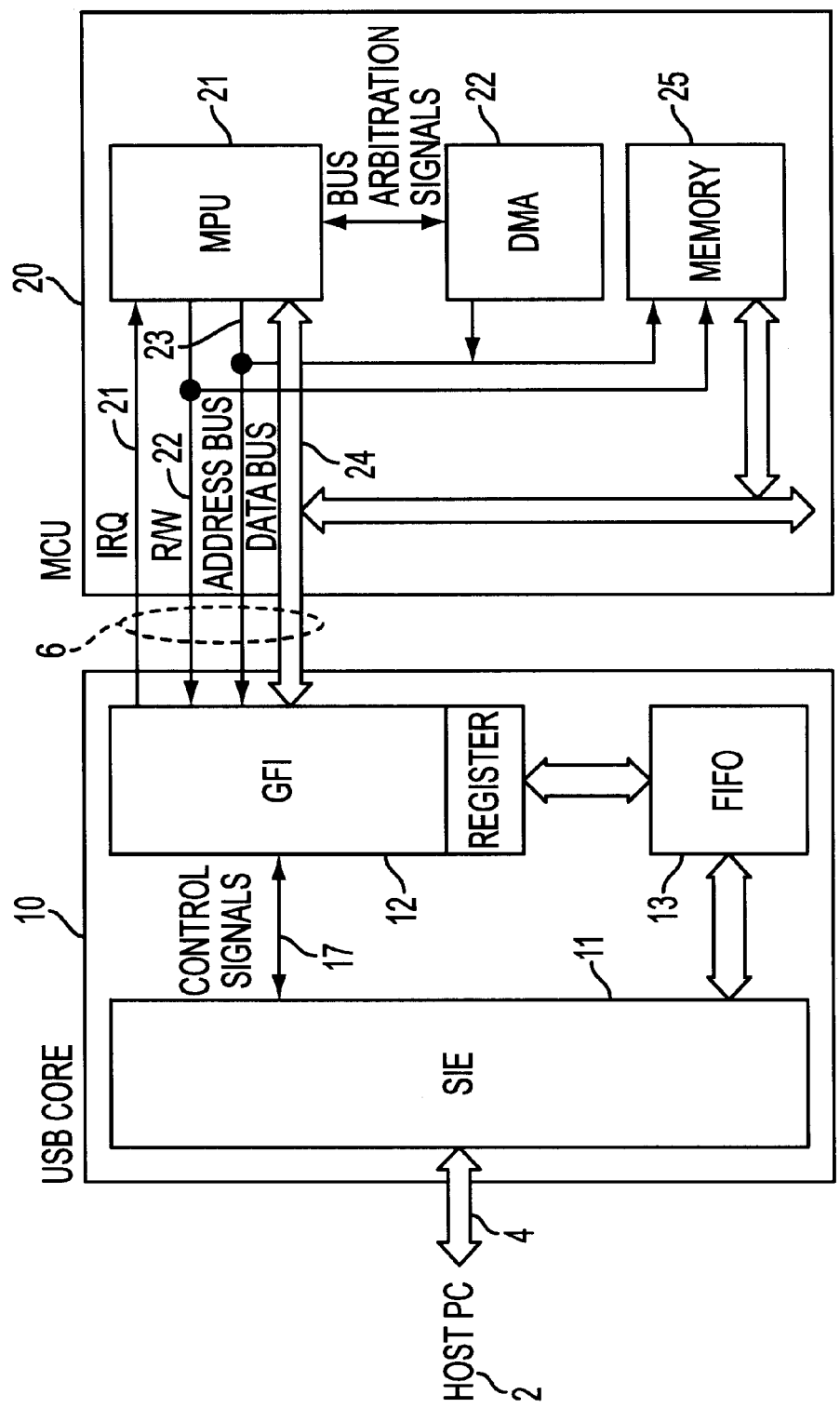
FIG. 1 illustrates a typical prior art device for controlling the transfer of data between a host PC and a peripheral device via a USP interface.
Figure 2:
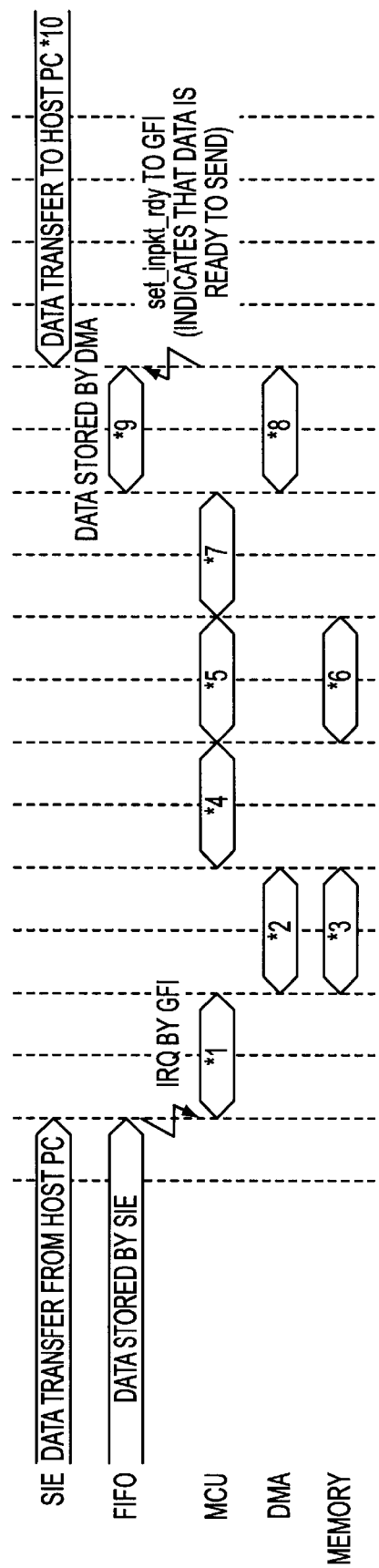
FIG. 2 illustrates the sequence of the data transfer process by the device illustrated in FIG. 1.

As described above, the device of the present invention for controlling memory access provides significant advantages over prior art devices. Most importantly, as the design of the present invention eliminates the requirement of the DMA unit and allows the USP core to directly store data into the shared memory contained in the MCU, the present invention significantly reduces the time required to transfer data between the USB core and the MCU. In fact, it is estimated that the present invention reduces the transfer time by ½ in comparison to the device illustrated in FIG. 1.

In addition, as the present design eliminates the need for the DMA unit contained in the MCU and the FIFO memory in the USB core, the design of the present invention represents a cost savings in comparison with prior art designs.

Another advantage associated with the present invention is that it provides the programmer extreme flexibility with regard to amount of the memory to allocate to the shared memory. More specifically, the programmer may readily vary the size of the shared memory in accordance with the given application to be executed. Moreover, any memory space not allocated to the shared memory can be allocated to the main memory unit of the MPU.

Yet another advantage is that even though the shared memory is typically accessible by the USB core, the design of the present invention allows the MPU to access memory and execute commands simultaneously with the storage of data in the shared memory by the USB core. Accordingly, in contrast to the device illustrated in FIG. 1, the present design functions to increase the overall operational speed of the device.

Although certain specific embodiments of the present invention have been disclosed, it is noted that the present invention may be embodied in other forms without departing from the spirit or essential characteristics thereof. The present embodiments are therefor to be considered in all respects as illustrative and not restrictive, the scope of the invention being indicated by the appended claims, and all changes that come within the meaning and range of equivalency of the claims are therefore intended to be embraced therein.

I claim:

1. A device for controlling memory access, said device comprising:
   an interface unit for receiving data from an external source; and
   a memory control unit coupled to said interface unit, said memory control unit comprising:
      a microprocessor unit;
      a main memory unit, said microprocessor unit retrieves data from and stores data in said main memory unit; and
      a shared memory unit, both said microprocessor and said interface unit retrieve data from and stores data in said shared memory unit, and
      a first bi-directional bus path directly connected to and extending from said interface unit to said shared memory unit,
   wherein said device is arranged and configured such that said microprocessor unit is capable of communicating with said main memory unit while said interface unit communicates with said shared memory.

2. The device of claim 1, wherein said interface unit is coupled to said shared memory unit so as to allow said interface unit to store data directly into said shared memory unit.

3. The device of claim 1, further comprising:
   a second bi-directional bus path extending from said interface unit to said microprocessor; and
   bus arbitration logic coupled to both said first bi-directional bus path and second bi-directional bus path, said bus arbitration logic capable of being in a first state or a second state;
   wherein in said first state, said first bi-directional bus path is not coupled to said second bi-directional bus path so as to prevent said microprocessor unit from accessing said shared memory unit, and in said second state, said first bi-directional bus path is coupled to said second bi-directional bus path so as to allow said microprocessor unit access to said shared memory unit.

4. The device of claim 3, wherein when said bus arbitration logic is in said first state, said microprocessor unit can access said main memory unit.

5. The device of claim 3, wherein when said bus arbitration logic is in said second state, said microprocessor unit can access either said main memory unit or said shared memory unit.

6. The device of claim 3, wherein said interface unit comprises:
   a serial interface unit operative for receiving data from an external source; and
   a general function interface unit coupled to said serial interface unit;
   said serial interface unit being coupled to said second bi-directional bus path, and operative for storing the data received from said external source directly into said shared memory unit.

7. The device of claim 1, wherein said interface unit forms a universal serial bus (USB) interface.

8. The device of claim 1, wherein said shared memory unit comprises a first-in, first-out memory device.

9. The device of claim 1, further comprising:
   a second bi-directional bus path extending from said interface unit to said microprocessor unit, wherein no portion of said first bi-directional bus path and said second bi-directional bus path is overlapped.

10. The device of claim 3, wherein said first bi-directional bus path and said second bi-directional bus path are data busses.

11. A device for controlling memory access, said device comprising:
    an interface unit for receiving data from an external source; and
    a memory control unit coupled to said interface unit, said memory control unit comprising:
       a microprocessor unit;
       a memory unit for communicating with both said interface unit and microprocessor unit; and
       at least two bi-directional bus paths extending from said interface unit to said memory control unit.

12. The device of claim 11, wherein in said first bi-directional bus path and said second bi-directional bus path are data busses.

13. The device of claim 12, said memory control unit further comprising:
    a shared memory unit, both said microprocessor and said interface unit retrieve data from and store data in said shared memory unit.

14. The device of claim 13, wherein said at least two bi-directional bus paths including first bi-directional bus path and second bi-directional bus path, said first bi-directional bus path extending from said interface unit to said shared memory unit, said second bi-directional bus path extending from said interface unit to said microprocessor unit.

15. The device of claim 14, wherein no portion of said first bi-directional bus path and second bi-directional bus path is overlapped.

16. The device of claim 12, wherein said interface unit forms a universal serial bus (USB) interface.

17. The device of claim 13, wherein said shared memory unit comprises a first-in, first-out memory device.

* * * * *